United States Patent
Onda et al.

(10) Patent No.: US 11,031,852 B2
(45) Date of Patent: Jun. 8, 2021

(54) MANUFACTURING METHOD OF STATOR, STATOR, AND BENDING PROCESS MACHINE

(71) Applicants: TOYOTA JIDOSHA KABUSHIKI KAISHA, Toyota (JP); DENSO CORPORATION, Kariya (JP)

(72) Inventors: Kazushi Onda, Toyota (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 104 days.

(21) Appl. No.: 16/269,654

(22) Filed: Feb. 7, 2019

(65) Prior Publication Data
US 2019/0252957 A1 Aug. 15, 2019

(30) Foreign Application Priority Data
Feb. 13, 2018 (JP) .............................. JP2018-023221

(51) Int. Cl.
| | | |
|---|---|---|
| H02K 15/00 | (2006.01) | |
| H02K 1/16 | (2006.01) | |
| H02K 3/12 | (2006.01) | |
| H02K 15/02 | (2006.01) | |
| H02K 3/32 | (2006.01) | |
| H02K 15/10 | (2006.01) | |
| B23K 26/24 | (2014.01) | |
| B21D 5/02 | (2006.01) | |
| H02K 1/27 | (2006.01) | |
| B23K 101/36 | (2006.01) | |

(52) U.S. Cl.
CPC .......... *H02K 15/0081* (2013.01); *B21D 5/02* (2013.01); *B23K 26/24* (2013.01); *H02K 1/16* (2013.01); *H02K 1/2766* (2013.01); *H02K 3/12* (2013.01); *H02K 3/32* (2013.01); *H02K 15/024* (2013.01); *H02K 15/105* (2013.01); *B23K 2101/36* (2018.08)

(58) Field of Classification Search
CPC .......... H02K 3/12; H02K 1/16; H02K 15/105; H02K 5/24
USPC ................ 310/179, 180, 184, 195, 201, 208
See application file for complete search history.

(56) References Cited

U.S. PATENT DOCUMENTS

| | | | | |
|---|---|---|---|---|
| 2011/0198953 A1* | 8/2011 | Shinohara | ................ | H02K 3/12 310/71 |
| 2011/0239442 A1* | 10/2011 | Utaka | ................ | H02K 15/0037 29/596 |
| 2011/0241462 A1* | 10/2011 | Utaka | ...................... | H02K 3/12 310/71 |

FOREIGN PATENT DOCUMENTS

| | | |
|---|---|---|
| JP | 2012-257391 | 12/2012 |
| JP | 2016-131453 | 7/2016 |

* cited by examiner

*Primary Examiner* — Jose A Gonzalez Quinones
(74) *Attorney, Agent, or Firm* — Oblon, McClelland, Maier & Neustadt, L.L.P.

(57) ABSTRACT

Manufacture of a stator clamps an intersection of two legs that are protruded from different slots provided in a stator core, that are adjacent to each other in a radial direction, and that intersect with each other without any other leading end located in a circumferential direction between their respective leading ends when being viewed in the radial direction. The manufacture then bends a leading end of an inner leg located on an inner side in the radial direction out of the clamped two legs, toward an outer circumferential side of the stator core, while bending a leading end of an outer leg located on an outer side in the radial direction, toward a shaft center side of the stator core.

8 Claims, 13 Drawing Sheets

MANUFACTURING METHOD OF STATOR, STATOR, AND BENDING PROCESS MACHINE

CROSS-REFERENCE TO RELATED APPLICATIONS

The present disclosure claims priority to Japanese Patent Application No. 2018-023221 filed Feb. 13, 2018, which is incorporated herein by reference in its entirety including specification, drawings and claims.

TECHNICAL FIELD

The present disclosure relates to a manufacturing method of a stator including a stator core and a plurality of coils, a stator, and a bending process machine used to manufacture the stator.

BACKGROUND

A known manufacturing method of a stator of a rotating electrical machine forms a plurality of coils by TIG-welding respective ends of a plurality of segment coils inserted in a plurality of slots provided in a stator core (as described in, for example, JP 2016-131453A). After inserting the plurality of segment coils in the plurality of slots provided in the stator core, the manufacturing method twists, in one direction, a first segment coil located on a first layer of the stator core and twists, in a direction opposite to the one direction, a second segment coil located on a second layer that adjoins to the first layer to be located on an outer side in a radial direction, thereby causing a first leading end of the first segment coil and a second leading end of the second segment coil to be adjacent to each other in the radial direction. The manufacturing method subsequently abuts a jig outward in the radial direction against the first leading end to deform the first leading end toward the second leading end and abuts the jig inward in the radial direction against the second leading end to deform the second leading end toward the first leading end. The manufacturing method then TIG-welds the first leading end with the second leading end in the state that the first leading end and the second leading end are in contact with each other.

SUMMARY

The manufacturing method of the stator described above suppresses a load by a residual stress from being applied to the weld, compared with a configuration that welds the first leading end and the second leading end with clamping and elastically deforming the two leading ends by earth electrodes. In a stator manufactured by the above method, however, the first leading end and the second leading end are extended in an axial direction of the stator core. This increases the axial length of the stator. In this stator, decreasing the lengths of the first leading end and the second leading end makes it difficult to weld the first leading end and the second leading end in the state that the first leading end and the second leading end are properly in contact with each other and is thus likely to reduce the bonding accuracy of the first leading end and the second leading end.

A main object of the present disclosure is accordingly to improve the bonding accuracy of a plurality of segment coils to form coils, while shortening the axial length of a stator.

The present disclosure is directed to a manufacturing method of a stator. The stator includes a stator core including a plurality of slots that are extended in a radial direction and that are formed at intervals in a circumferential direction and a plurality of segment coils respectively including a pair of legs that are inserted in different slots. The plurality of segment coils are configured to form a plurality of stator coils by electrical bonding of leading ends of corresponding legs. The manufacturing method includes arranging the plurality of segment coils to be adjacent to each other in the radial direction and assembling the plurality of segment coils to the stator core, such that a plurality of the legs are protruded from each of the plurality of slots, tilting the plurality of legs protruded from the plurality of slots, such that leading ends of two legs adjacent to each other in the radial direction are respectively inclined relative to a shaft center of the stator core and are extended in opposite directions along the circumferential direction, clamping an intersection of two legs that are protruded from different slots, that are adjacent to each other in the radial direction, and that intersect with each other without any other leading end located in the circumferential direction between respective leading ends thereof when being viewed in the radial direction, bending the leading end of an inner leg located on an inner side in the radial direction out of the clamped two legs, toward an outer circumferential side of the stator core, and bending the leading end of an outer leg located on an outer side in the radial direction, toward a shaft center side of the stator core, and welding the leading ends that are opposed to each other.

The manufacturing method of the stator of this aspect tilts the plurality of legs protruded from the plurality of slots, such that the leading ends of the two legs adjacent to each other in the radial direction are extended in the opposite directions along the circumferential direction. The leading ends that are to be bonded to each other accordingly approach in the state that the leading ends are inclined in the opposite directions relative to the shaft center of the stator core. The manufacturing method subsequently clamps the intersection of the two legs that are protruded from different slots, that are adjacent to each other in the radial direction, and that intersect with each other without any other leading end located in the circumferential direction between their respective leading ends when being viewed in the radial direction. The manufacturing method then bends the leading end of the inner leg located on the inner side in the radial direction out of the clamped two legs, toward the outer circumferential side of the stator core about the intersection as a starting point, while bending the leading end of the outer leg located on the outer side in the radial direction, toward the shaft center side of the stator core about the intersection as the starting point. This series of processing is repeated, so that the leading ends that are to be bonded to each other come into contact with each other, while being extended substantially parallel to each other by the spring-back of the legs. This enables the leading ends that are inclined relative to the shaft center of the stator core and that are opposed to each other, to be welded to each other in the state that the leading ends are properly in contact with each other, and thereby improves the bonding accuracy (welding quality) of the plurality of segment coils. Inclining the leading ends of the plurality of legs relative to the shaft center of the stator core significantly shortens the axial length of a coil end portion. As a result, the manufacturing method of the stator of this aspect improves the bonding accuracy of the plurality of segment coils to form the stator coils, while shortening the axial length of the stator.

Further, the inner leg may be a leg adjacent to a leg that is to be bonded to the outer leg, in the circumferential direction on a slot side which the outer leg is inserted in, and the outer leg may be a leg adjacent to a leg that is to be bonded to the inner leg, in the circumferential direction on a slot side which the inner leg is inserted in.

The manufacturing method of the stator may further include clamping the intersection of the inner leg and the outer leg by means of a clamp member, holding an inner side face on a leading end side of the inner leg by a bending member, and holding an outer side face on the leading end side of the outer leg by the bending member, and rotating the clamp member and the bending member relative to each other to bend the leading ends of the inner leg and the outer leg. This configuration efficiently bends the leading ends of the inner leg and the outer leg in a narrow space where a large number of legs are arranged.

The manufacturing method of the stator may further includes forming the segment coils from a conductor coated with an insulating layer, and processing the leading end such that a surface of the leading end on an opposite side to a tilting direction of the leg is inclined in the tilting direction, and removing the insulating layer from the leading end. The configuration that the surface of the leading end on the opposite side to the tilting direction of the leg is inclined in the tilting direction further shortens the axial length of the coil end portion.

The manufacturing method of the stator may further includes forming the surface of the leading end on the opposite side to the tilting direction as a curved surface. This configuration further planarizes the coil end portion, while ensuring a sufficient bonding area for the leading ends.

The manufacturing method of the stator may further includes bonding the leading ends that are opposed to each other by laser welding. This configuration enables the leading ends that are inclined in the opposite directions relative to the shaft center of the stator core to be bonded to each other with high accuracy.

The present disclosure is directed to a stator. The stator includes a stator core including a plurality of slots that are extended in a radial direction and that are formed at intervals in a circumferential direction and a plurality of segment coils, respectively including a pair of legs that are inserted in different slots. The plurality of segment coils are configured to form a plurality of stator coils by electrical bonding of leading ends of corresponding legs. The plurality of segment coils are arranged to be adjacent to each other in the radial direction and are assembled to the stator core, such that a plurality of the legs are protruded from each of the plurality of slots, the plurality of legs protruded from the plurality of slots are tilted, such that leading ends of two legs adjacent to each other in the radial direction are respectively inclined relative to a shaft center of the stator core and are extended in opposite directions along the circumferential direction, and out of two legs having leading ends that are to be electrically bonded to each other, one leading end located on an inner side in the radial direction is bent toward an outer circumferential side of the stator core, and the other leading end located on an outer side in the radial direction is bent toward a shaft center side of the stator core.

In the stator of this aspect, the plurality of legs protruded from the plurality of slots are tilted, such that the leading ends of the two legs adjacent to each other in the radial direction are respectively inclined relative to the shaft center of the stator core and are extended in the opposite directions along the circumferential direction. This configuration significantly shortens the axial length of the coil end portion. Additionally, out of the two legs having the leading ends that are to be electrically bonded to each other, one leading end located on the inner side in the radial direction is bent toward the outer circumferential side of the stator core, whereas the other leading end located on the outer side in the radial direction is bent toward the shaft center side of the stator core. The leading ends that are to be bonded to each other are accordingly welded to each other, while being extended substantially parallel to each other and properly come into contact with each other by the spring-back of the legs. The configuration of the stator of this aspect thus improves the bonding accuracy of the plurality of segment coils to form the stator coils, while shortening the axial length.

In the stator of this aspect, a surface of the leading end on an opposite side to a tilting direction of the leg may be formed to be inclined in the tilting direction. This configuration further shortens the axial length of the coil end portion.

In the stator of another aspect, the surface of the leading end on the opposite side to the tilting direction may be formed as a curved surface. This configuration further planarizes the coil end portion, while ensuring a sufficient bonding area for the leading ends.

In the stator of another aspect, the leading ends of the corresponding legs may be bonded to each other via a laser weld.

The present disclosure is directed to a bending process machine used to manufacture a stator. The stator includes a stator core including a plurality of slots that are extended in a radial direction and that are formed at intervals in a circumferential direction and a plurality of segment coils, each having a pair of legs that are inserted in different slots. The plurality of segment coils are configured to form a plurality of stator coils by electrical bonding of leading ends of corresponding legs. The bending process machine includes a clamp member configured to clamp an intersection of two legs that are protruded from different slots, that are tilted to be adjacent to each other in the radial direction, and that intersect with each other without any other leading end located in the circumferential direction between respective leading ends thereof when being viewed in the radial direction, a bending member including a first holding portion configured to hold an inner side face on a leading end side of an inner leg located on an inner side in the radial direction out of the two legs clamped by the clamp member, and a second holding portion configured to hold an outer side face on the leading end side of an outer leg located on an outer side in the radial direction out of the two legs clamped by the clamp member, and a driving unit configured to rotate the clamp member and the bending member relative to each other.

The bending process machine of this aspect is configured to bend the leading ends of the plurality of legs protruded from the plurality of slots of the stator core. Prior to the bending process by the bending process machine, the plurality of legs protruded from the plurality of slots are tilted, such that the leading ends of the two legs adjacent to each other in the radial direction are respectively inclined relative to the shaft center of the stator core and are extended in the opposite directions along the circumferential direction. After the plurality of legs are tilted, the intersection of the two legs that are protruded from different slots, that are adjacent to each other in the radial direction, and that intersect with each other without any other leading end located in the circumferential direction between their respective leading ends when being viewed in the radial direction, is clamped by the clamp member. Additionally, the first holding portion of the bending member is placed to come into contact with the inner side face on the leading end side of the inner leg located on the inner side in the radial direction, out of the two legs clamped by the clamp member. The second holding portion of the bending member is placed to come into contact with the outer side face on the leading end side of the outer leg located on the outer side in the radial direction, out of the two legs clamped by the clamp member. The driving unit is then operated to rotate the clamp member and the bending member relative to each other. This configuration bends the leading end of the inner leg toward the outer circumferential side of the stator core about the intersection as the starting point, while bending the leading end of the outer leg toward the shaft center side of the stator core about the intersection as the starting point. Repeating this series of processing enables the leading ends of the inner leg and the outer leg to be efficiently bent in a narrow space where a large number of legs are arranged, and enables the leading ends that are to be bonded to each other, to come into contact with each other while being extended substantially parallel to each other by the spring-back of the legs. This enables the leading ends that are inclined relative to the shaft center of the stator core and that are opposed to each other, to be welded to each other in the state that the leading ends are properly in contact with each other, and thereby improves the bonding accuracy (welding quality) of the plurality of segment coils. Using the bending process machine of this aspect inclines the leading ends of the plurality of legs relative to the shaft center of the stator core, so as to shorten the axial length of the stator, while improving the bonding accuracy of the plurality of segment coils to form the stator coils.

In the bending process machine of the above aspect, the bending member may further include a first pressing portion configured to press a leg that is adjacent to the outer leg in the circumferential direction on a leading end side of the inner leg, outward in the radial direction; and a second pressing portion configured to press a leg that is adjacent to the inner leg in the circumferential direction on a leading end side of the outer leg, inward in the radial direction. This configuration suppresses interference of the legs that are to be processed, with legs located in the periphery in the bending process of the leading ends of the legs and thereby effectively suppresses the legs of the segment coils from being damaged.

In the bending process machine of the above aspect, the first pressing portion may include a first movement restricting surface that is arranged to intersect with a pressing surface of the first holding portion and restricts movement of the inner leg in the circumferential direction. The second pressing portion may include a second movement restricting surface that is arranged to intersect with a pressing surface of the second holding portion and restricts movement of the outer leg in the circumferential direction. This configuration enables the inner side face on the leading end side of the inner leg to smoothly come into contact with the pressing surface of the first holding portion, and enables the outer side face on the leading end side of the outer leg to smoothly come into contact with the pressing surface of the second holding portion.

In the bending process machine of the above aspect, the clamp member may include a first movement restrictor configured to restrict movement in the circumferential direction of a leg that is adjacent to the inner leg in the circumferential direction on the leading end side of the outer leg; and a second movement restrictor configured to restrict movement in the circumferential direction of a leg that is adjacent to the outer leg in the circumferential direction on the leading end side of the inner leg. This configuration more effectively suppresses interference of the legs that are to be processed, with the legs located in the periphery in the bending process of the leading ends of the legs.

In the bending process machine of the above aspect, the first movement restrictor may include a first inclined surface configured to restrict movement of the inner leg in an axial direction of the stator core. The second movement restrictor may include a second inclined surface configured to restrict movement of the outer leg in the axial direction of the stator core. This configuration more properly clamps the intersection of the inner leg and the outer leg, while suppressing rattle, and enables the leading ends of the inner leg and the outer leg to be bent with high accuracy.

DESCRIPTION OF EMBODIMENTS

The following describes some aspects of the disclosure with reference to embodiments.

Figure 1:
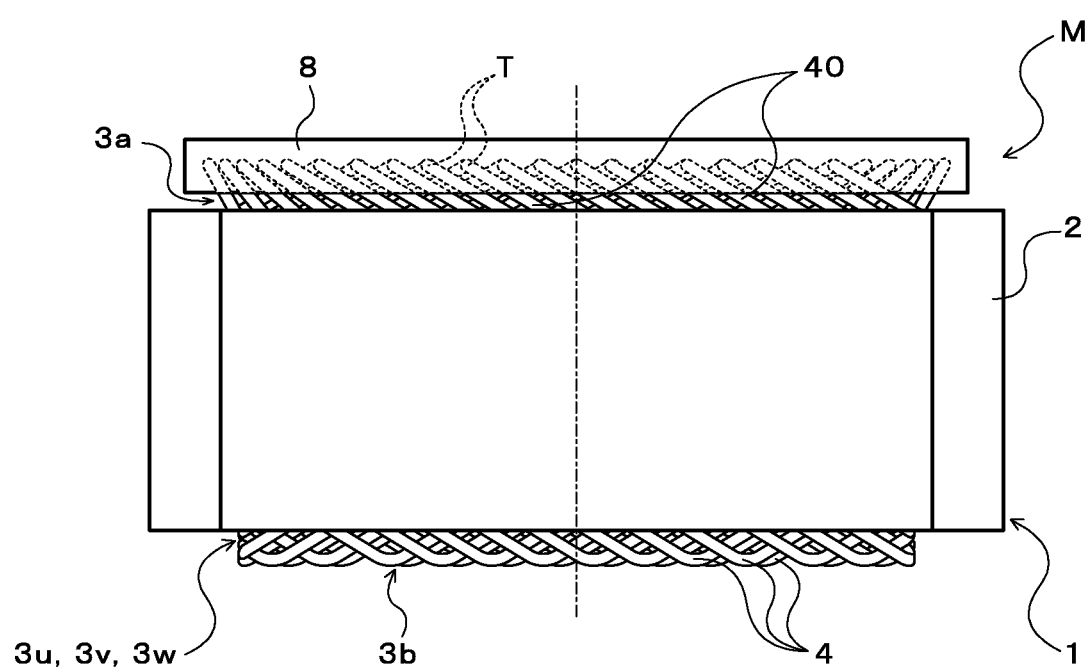
FIG. 1 is a schematic configuration diagram illustrating a rotating electrical machine including a stator according to the present disclosure.
Figure 2:
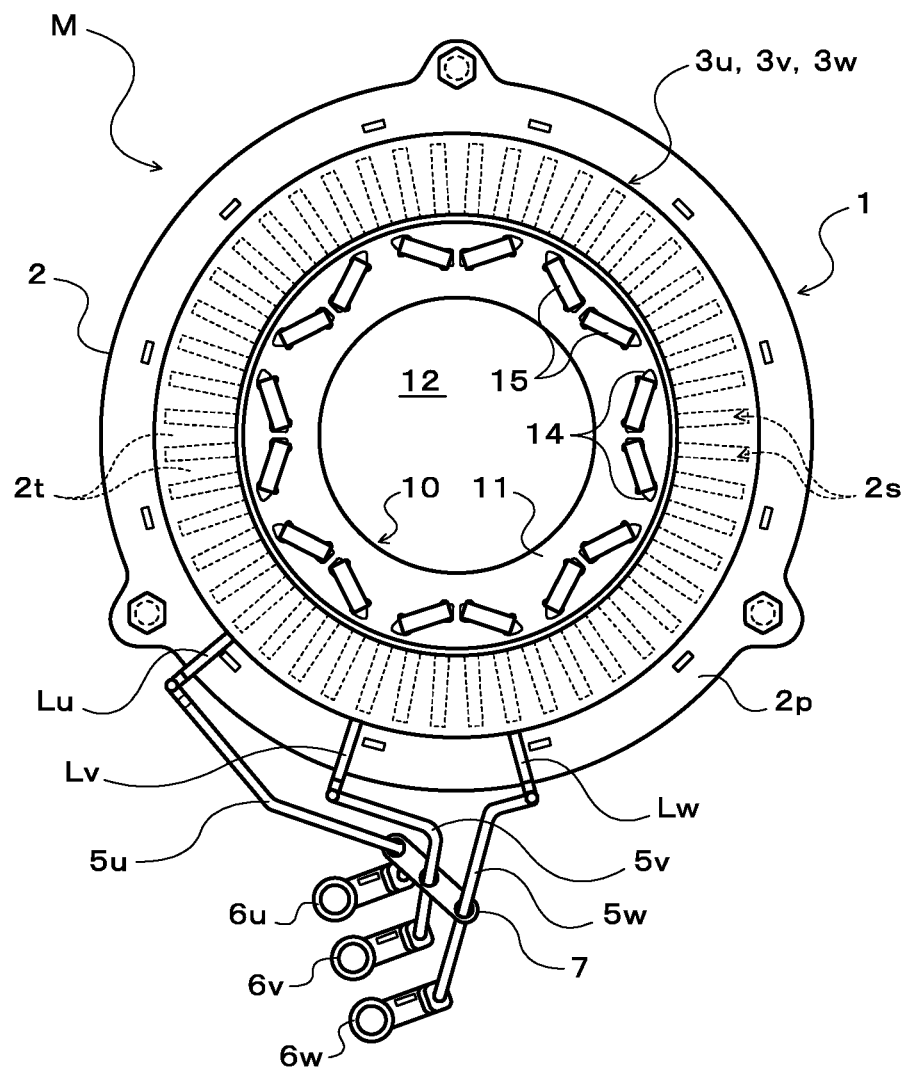
FIG. 2 is a plan view illustrating the rotating electrical machine according to the present disclosure.

FIG. 1 is a schematic configuration diagram illustrating a rotating electrical machine M including a stator 1 according to the present disclosure. FIG. 2 is a plan view illustrating the rotating electrical machine M. The rotating electrical machine M illustrated in these drawings may be, for example, a three-phase AC motor used as a driving power source or a generator of an electric vehicle or a hybrid vehicle. As illustrated, the rotating electrical machine M includes a stator 1 and a rotor 10 that is rotatably placed in the stator 1 via an air gap.

The stator 1 include a stator core 2 and a plurality of stator coils 3u, 3v and 3w. The stator core 2 is formed by layering a plurality of electromagnetic steel sheets 2p (shown in FIG. 2) formed in an annular, for example, by pressing and is in a ring shape as a whole. The stator core 2 includes a plurality of teeth 2t protruded radially inward from an annular outer circumferential portion (yoke) and arranged at intervals in a circumferential direction, and a plurality of slots 2s formed between respective adjacent teeth 2t (both shown in FIG. 2). The plurality of slots 2s are respectively extended in the radial direction of the stator core 2 and are arranged at fixed intervals along the circumferential direction. An insulator (insulating paper) (not shown) is placed in each of the slots 2s. The stator core 2 may be integrally formed by, for example, press molding and sintering ferromagnetic fine particles.

Figure 3:
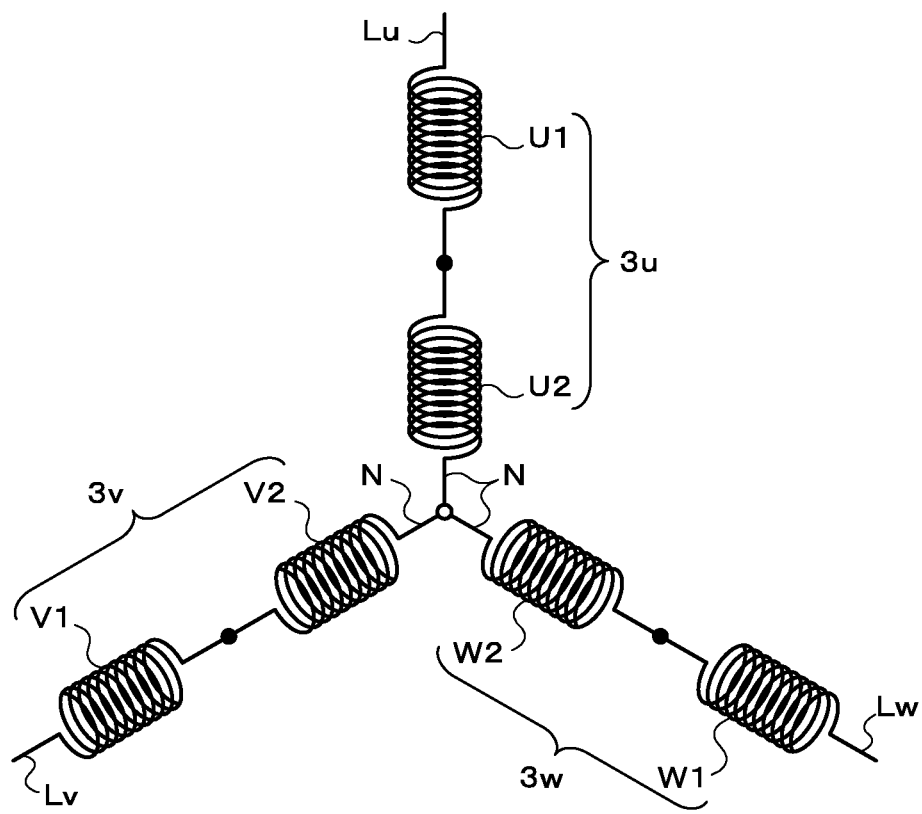
FIG. 3 is a diagram illustrating stator coils included in the stator according to the present disclosure.

As shown in FIG. 3, the stator coils 3u, 3v and 3w are connected by single star wire connection (1Y wire connection). According to this embodiment, the stator coil 3u for a U phase includes a first coil U1 and a second coil U2. Similarly, the stator coil 3v for a V phase includes a first coil V1 and a second coil V2, and the stator coil 3w for a W phase includes a first coil W1 and a second coil W2. The first coils U1, V1 and W1 respectively include lead wires Lu, Lv and Lw, and the second coils U2, V2 and W2 respectively include neutral wires N.

Each of the stator coils 3u, 3v and 3w is formed by electrically bonding a plurality of segment coils 4 that are inserted in the plurality of slots 2s of the stator core 2. The segment coil 4 is formed by bending a rectangular wire (conductor) that has surface, for example, enamel-coated with a resin insulating layer, in an approximate U shape and includes a pair of legs 40 with respective insulating layer-uncoated leading ends T (as shown in FIG. 1). The pair of legs 40 of each segment coil 4 are respectively inserted in different slots 2s of the stator core 2, and protruded parts of the respective legs 40 that are protruded from one end face (upper end face in FIG. 1) of the stator core 2 are tilted by a tilting process machine (not shown). The tilted leading end T of each segment coil 4 is electrically bonded to the corresponding leading end T of another segment coil 4 by laser welding.

More specifically, the plurality of segment coils 4 are overlaid on each other such that longer side faces of the legs 40 abut on each other and are assembled to the stator core 2 such that an identical even number of (for example, six to ten) legs 40 are protruded from each of the plurality of slots 2s. The plurality of legs 40 protruded from each slot 2s are expanded in the radial direction of the stator core 2 by using an expansion jig. Additionally, an odd-numbered leg 40 (on an odd-numbered layer) from a shaft center of the stator core 2 is twisted around the shaft center of the stator core 2 and is tilted to one side in the circumferential direction, while an even-numbered leg 40 (on an even-numbered layer) is twisted around the shaft center of the stator core 2 and is tilted to the other side in the circumferential direction. Accordingly, the leading ends T of any two legs 40 that are adjacent to each other in the radial direction are respectively tilted relative to the shaft center of the stator core 2 and are extended in opposite directions along the circumferential direction.

The corresponding leading ends T of the legs 40 protruded from every m-th slot 2s (where "m" denotes a total number of the first and the second coils U1 to W2) are bonded to each other by laser welding, so that the first and the second coils U1 to W2 of the stator coils 3u, 3v and 3w are wound on the stator core 2. In other words, in the stator 1, the m coils U1 to W2 are wound on the stator core 2 by electrical bonding of the leading ends T of the legs 40 protruded from an (i+(j−1)·m)-th slot 2s (where i=1, . . . , m, and j=1, . . . , total number of slots/m).

Figure 4:
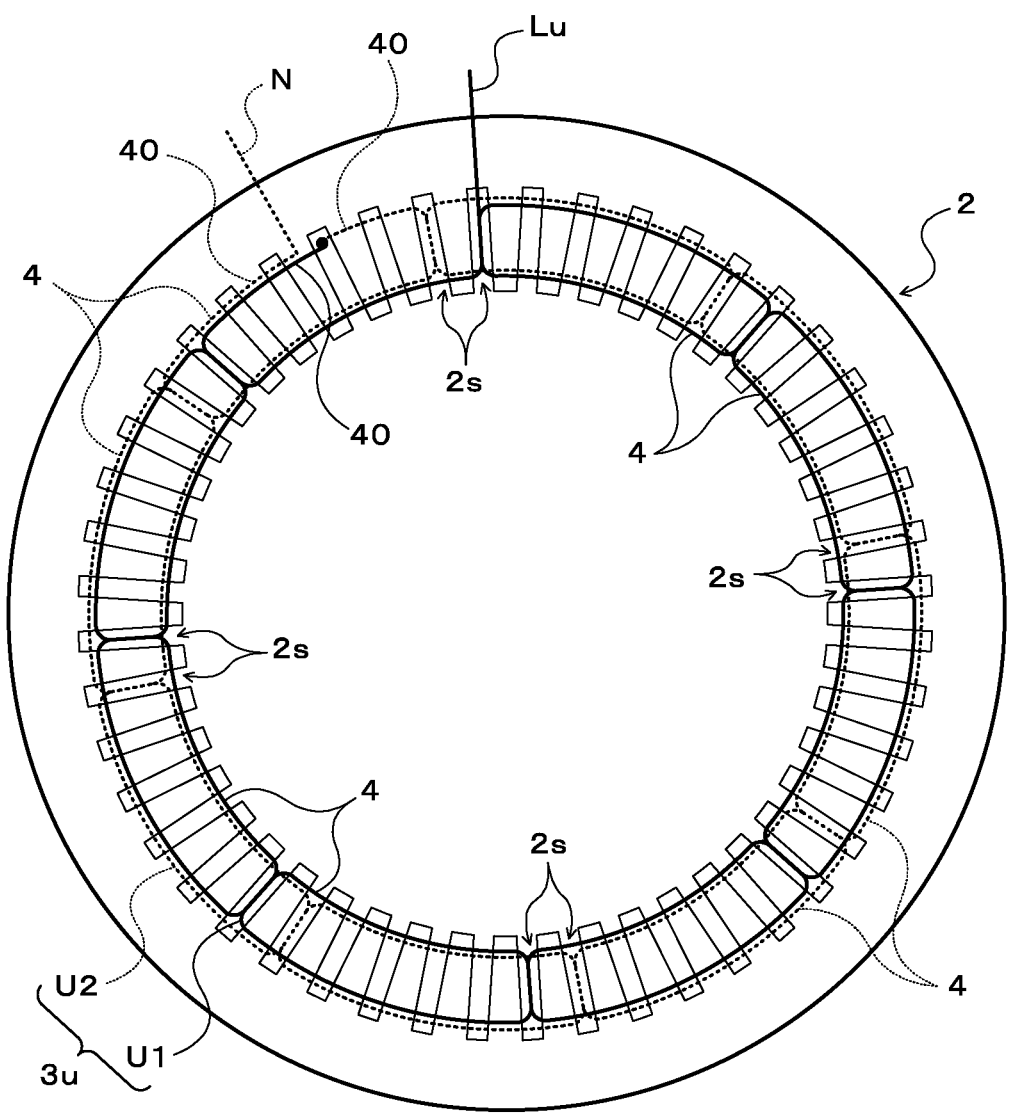
FIG. 4 is a diagram illustrating stator coils included in the stator according to the present disclosure.

According to the embodiment, the first coil U1 and the second coil U2 of the stator coil 3u are wound to be shifted from each other by one slot in the circumferential direction relative to the stator core 2 as shown in FIG. 4. The leg 40 on one end side of the first coil U1 is used as the lead wire Lu, and the leg 40 on one end side of the second coil U2 is used as the neutral wire N. Additionally, the leading end T of the leg 40 that forms an opposite side end to the lead wire Lu of the first coil U1 is bonded to the leading end T of the leg 40 that forms an opposite side end to the neutral wire N of the second coil U2, so that the stator coil 3u is wound in a distributed manner on the stator core 2.

The first coil V1 of the stator coil 3v is wound to be shifted by one slot in the circumferential direction relative to the second coil U2 of the stator coil 3u on an opposite side to the first coil U1. The second coil V2 of the stator coil 3v is wound to be shifted by one slot in the circumferential direction relative to the first coil V1 on an opposite side to the second coil U2 of the stator coil 3u. The leg 40 on one end side of the first coil V1 is used as the lead wire Lv, and the leg 40 on one end side of the second coil V2 is used as the neutral wire N. Additionally, the leading end T of the leg 40 that forms an opposite side end to the lead wire Lv of the first coil V1 is bonded to the leading end T of the leg 40 that forms an opposite side end to the neutral wire N of the second coil V2, so that the stator coil 3v is wound in a distributed manner on the stator core 2.

The first coil W1 of the stator coil 3w is wound to be shifted by one slot in the circumferential direction relative to the second coil V2 of the stator coil 3v on an opposite side to the first coil V1. The second coil W2 of the stator coil 3w is wound to be shifted by one slot in the circumferential direction relative to the first coil W1 on an opposite side to the second coil V2 of the stator coil 3v. The leg 40 on one end side of the first coil W1 is used as the lead wire Lw, and the leg 40 on one end side of the second coil W2 is used as the neutral wire N. Additionally, the leading end T of the leg 40 that forms an opposite side end to the lead wire Lw of the first coil W1 is bonded to the leading end T of the leg 40 that forms an opposite side end to the neutral wire N of the second coil W2, so that the stator coil 3w is wound in a distributed manner on the stator core 2.

As shown in FIG. 2, the lead wire Lu of the stator coil 3u is electrically bonded by welding to a leading end of a power line 5u that is electrically bonded to a terminal 6u of the U phase. The lead wire Lv of the stator coil 3v is also electrically bonded by welding to a leading end of a power line 5v that is electrically bonded to a terminal 6v of the V phase. The lead wire Lw of the stator coil 3w is also electrically bonded by welding to a leading end of a power line 5w that is electrically bonded to a terminal 6w of the W phase. The power lines 5u, 5v and 5w are respectively fixed to a resin holder member 7. The terminals 6u to 6w are fixed to a terminal base (not shown) placed (fixed) in a housing of the rotating electrical machine M when the stator 1 is assembled to the housing, and are connected with an inverter (not shown) via a power line (not shown).

Figure 5:
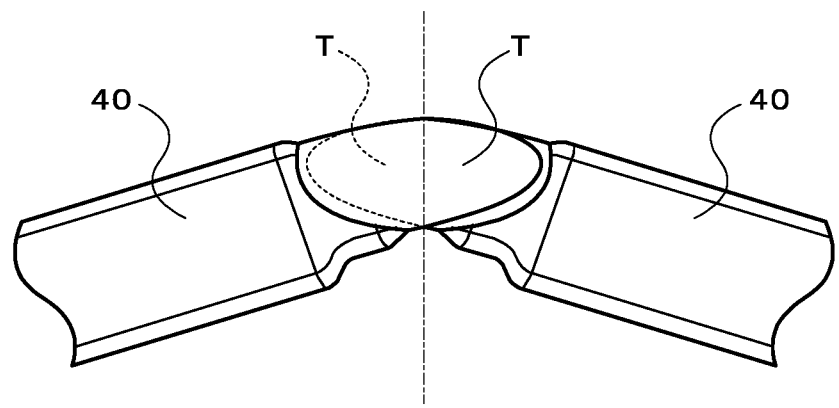
FIG. 5 is an enlarged view illustrating bonding of leading ends of segment coils in the stator according to the present disclosure.

In the plurality of stator coils 3*u*, 3*v* and 3*w* wound on the stator core 2 as described above, the joints of the large number of leading ends T are arrayed by every predetermined number in the radial direction to form a ring-shaped coil end portion 3*a* that is protruded outward from an upper end face (shown in FIG. 1) in the axial direction of the stator core 2. As shown in FIG. 1 and FIG. 5, the plurality of legs 40 protruded from the plurality of slots 2*s* are tilted such that the leading ends T of any two legs 40 adjacent to each other in the radial direction are inclined to the shaft center of the stator core 2 (shown by the one-dot chain line) and are extended in the opposite directions along the circumferential direction. In the stator 1, this configuration significantly shortens the axial length of the coil end portion 3*a* including a large number of the joints of the leading ends T of the segment coils 4.

According to the embodiment, the leading end T of each leg 40 is punched to be tapered and to have a shorter side face extended as a convex curved surface (as shown in FIG. 5), prior to assembling of the segment coil 4 to the stator core 2. In other words, an opposite surface of each leading end T to the tilting direction of the leg 40 is formed to be inclined to the tilting direction. This configuration further shortens the axial length of the coil end portion 3*a*. Additionally, forming the curved surface of each leading end T on the opposite side to the tilting direction ensures a sufficient bonding area for the leading ends T and further planarizes the coil end portion 3*a*. The insulating layer of the leading end T may be peeled off, for example, by laser radiation after the punching described above. Chamfering of the periphery of the leading end T is omitted in the segment coil 4.

Figure 6:
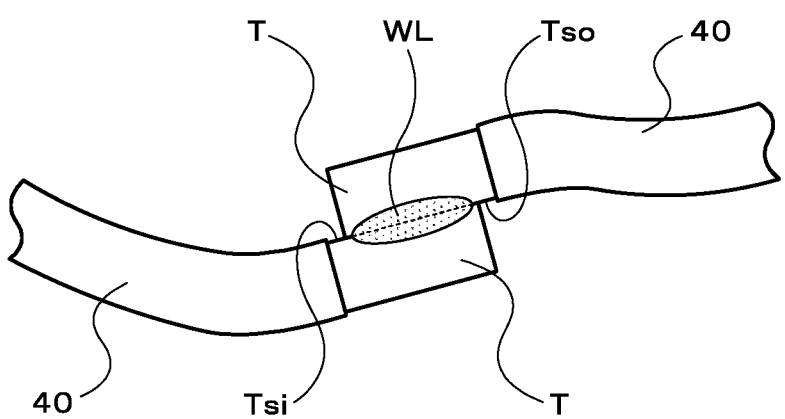
FIG. 6 is an enlarged view illustrating bonding of leading ends of segment coils in the stator according to the present disclosure.

Additionally, as shown in FIG. 6, in the stator 1, out of the two legs 40 having their leadings ends T that are to be bonded to each other, one leading end T located on the inner side in the radial direction (upper side in the drawing) is bent toward the outer circumference side of the stator core 2 (downward in the drawing), whereas the other leading end T located on the outer side in the radial direction (lower side in the drawing) is bent toward the shaft center side of the stator core 2 (upward in the drawing). An outside surface Tso of one leading end T located on the inner side in the radial direction and an inside surface Tsi of the other leading end T located on the outer side in the radial direction are bonded to each other via a laser weld WL.

The stator core 2 is coated with a resin such as varnish from the coil end portion 3*a*-side that is the upper side in FIG. 1 toward a coil end portion 3*b*-side that is the lower side in FIG. 1. This resin coating fixes the respective segment coils 4 and the insulators (not shown) to the stator core 2. The stator 1 of the embodiment includes a ring-shaped mold portion 8 provided to cover the coil end portion 3*a*. The mold portion 8 is made of a resin, which enters the clearances between the adjacent segment coils 4 to effectively insulate exposed parts of the conductors, such as joints between the leading ends T and the joints between the lead wires Lu to Lw and the power lines 5*u* to 5*w*. According to a modification, the exposed parts of the conductors such as the joints between the leading ends T of the segment coils 4 may be coated with insulating power.

As shown in FIG. 2, the rotor 10 of the rotating electrical machine M is a magnet-embedded type (1 PM type) rotor including a rotor core 11 that is fixed to a rotating shaft (not shown) and a plurality of (for example, sixteen according to the embodiment) permanent magnets 15 that are embedded in the rotor core 11 to form a plurality of magnetic poles (for example, eight poles according to the embodiment). The rotor core 11 of the rotor 10 is formed by layering a plurality of core plates formed in a ring shape from electromagnetic steel sheets or the like and includes a center hole 12 which the rotating shaft is inserted and fixed in, and a plurality of magnet embedding holes 14 that are long holes formed to hold the permanent magnets 15 therein. The plurality of magnet embedding holes 14 are provided in the rotor core 11, such as to be arranged in twos at predetermined intervals and to pass through the rotor core 11 in the axial direction. The paired two magnet embedding holes 14 are formed, such as to separate from each other from the shaft center side toward the outer circumference side of the rotor 10 (to form an approximately V shape). The permanent magnets 15 are rare earth sintered magnets such as neodymium magnets and are formed in an approximately rectangular parallelepiped shape. The paired two permanent magnets 15 are inserted and fixed in the corresponding magnet embedding holes 14, such that the same poles are located on the outer circumferential side of the rotor 10. The paired two permanent magnets 15 are accordingly provided in the rotor core 11 such as to separate from each other from the shaft center side toward the outer circumferential side of the rotor 10 and to form one magnetic pole of the rotor 10.

Figure 7:
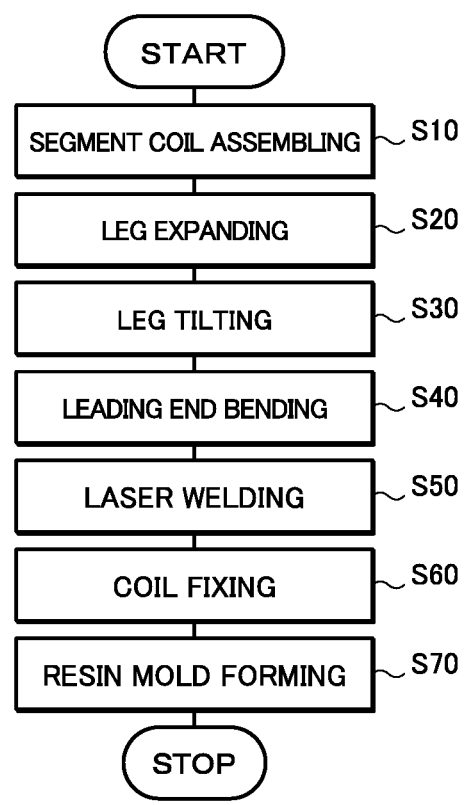
FIG. 7 is a flowchart showing a manufacturing procedure of the stator of the rotating electrical machine.

FIG. 7 is a flowchart showing a manufacturing procedure of the stator 1 of the rotating electrical machine M. As shown in FIG. 7, the manufacturing procedure of the stator 1 includes a segment coil assembling process (S10), a leg expanding process (S20), a leg tilting process (S30), a leading end bending process (S40), a laser welding process (S50), a coil fixing process (S60) and a resin mold forming process (S70).

The segment coil assembling process (S10) is a process of assembling a plurality of segment coils 4 that are arranged to be adjacent to each other in the radial direction of the stator core 2, to the stator core 2, such that the identical even number of legs 40 are protruded from each of the plurality of slots 2*s*. The leg expanding process (S20) is a process of expanding the plurality of legs 40 protruded from each of the slots 2*s*, in the radial direction of the stator core 2. The leg tilting process (S30) is a process of causing an odd-numbered leg 40 (on an odd-numbered layer) from the shaft center side of the stator core 2 to be tilted to one side in the circumferential direction with being twisted around the shaft center of the stator core 2 and causing an even-numbered leg 40 (on an even-numbered layer) to be tilted to the other side in the circumferential direction with being twisted around the shaft center of the stator core 2 by using the tilting process machine (not shown). The leading end bending process (S40) is a process of bending the leading ends T of the plurality of legs 40 protruded from the plurality of slots 2*s* toward the outer circumference side or toward the shaft center side of the stator core 2. The laser welding process (S50) is a process of bonding the outside surface Tso of the leading end T of the leg 40 located on the inner side in the radial direction, to the inside surface Tsi of the leading end T of the corresponding leg 40 located on the outer side in the radial direction by laser welding and bonding the lead wires Lu to Lw to the power lines 5*u* to 5*w* by laser welding. The coil fixing process (S60) is a process of fixing the plurality of segment coils 4 and the like to the stator core 2 by using the resin such as varnish. The resin mold forming process (S70) is a process of forming the ring-shaped mold portion 8 to cover the coil end portion 3*a* of the plurality of stator coils 3*u*, 3*v* and 3*w*.

Figure 8:
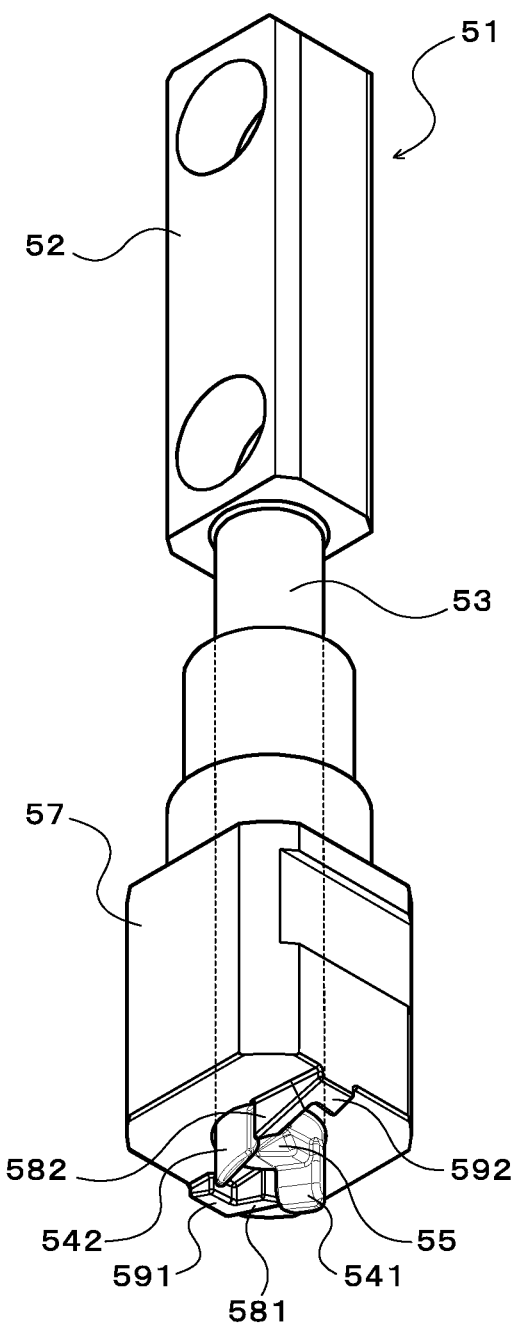
FIG. 8 is a perspective view illustrating a main part of a bending process machine.

FIG. 8 is a perspective view illustrating a main part of a bending process machine 50 used in the leading end bending process at S40 of FIG. 7.

Figure 9:
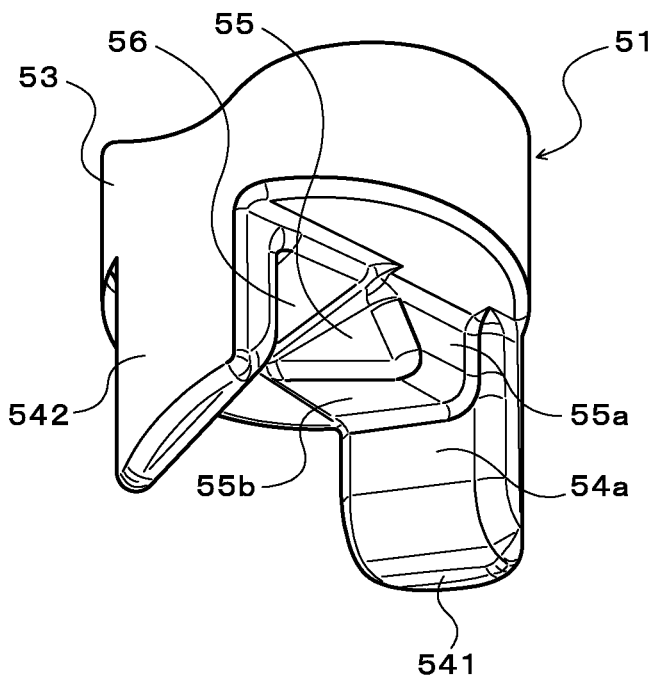
FIG. 9 is an enlarged perspective view illustrating a clamp member in the bending process machine according to the present disclosure.
Figure 10:
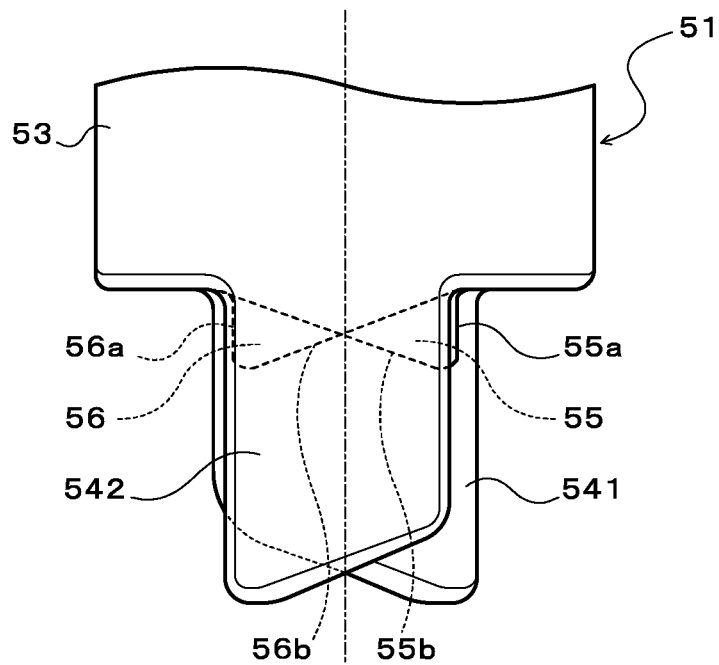
FIG. 10 is an enlarged view illustrating a clamp member in the bending process machine according to the present disclosure.

The bending process machine 50 includes a clamp member 51 configured to clamp the two legs 40 that are adjacent to each other in the radial direction, and a bending member 57 configured to bend the leading ends T of the two legs 40 clamped by the clamp member 51. As shown in FIG. 9 and FIG. 10, the clamp member 51 includes a base end portion 52, a shaft portion 53 in a cylindrical rod shape extended from the base end portion 52, a pair of first claw 541 and second claw 542 extended from a leading end of the shaft portion 53, and a first movement restrictor 55 and a second movement restrictor 56 formed between the first claw 541 and the second claw 542 in the radial direction.

The first claw 541 and the second claw 542 are formed on the shaft portion 53 to be opposed to each other in the radial direction of the shaft portion 53, and respectively have inner surfaces 54a that are extended in the axial direction of the shaft portion 53. The inner surfaces 54a of the first claw 541 and the second claw 542 are extended parallel to each other and are opposed to each other across an interval that is slightly longer than twice the shorter side width of the segment coil 4. A free end of the first claw 541 is cut obliquely to be extended substantially parallel to the legs 40 on the odd-numbered layers after the tilting process, and a free end of the second claw 542 is cut obliquely to be extended substantially parallel to the legs 40 on the even-numbered layers after the tilting process. Additionally, the free ends of the first claw 541 and the second claw 542 are formed to be tapered from the shaft center side toward the outer circumferential side of the shaft portion 53. According to the embodiment, the maximum thickness of the first claw 541 and the second claw 542 may be, for example, about 1 to 2 mm.

The first movement restrictor 55 is a protrusion having an approximately right triangular sectional shape. The first movement restrictor 55 includes a circumferential direction movement restricting surface 55a that is extended in the axial direction of the shaft portion 53 along a longer side edge of the first claw 541 and that is substantially perpendicular to the inner surface 54a of the first claw 541, and an axial direction movement restricting surface (first inclined surface) 55b that is a slope inclined to a plane perpendicular to the shaft center of the shaft portion 53. The axial direction movement restricting surface 55b is formed to be extended along the first claw 541 from a leading end of the circumferential direction movement restricting surface 55a and to be extended substantially parallel to the legs 40 on the odd-numbered layers after the tilting process.

The second movement restrictor 56 is a protrusion having an approximately right triangular sectional shape. The second movement restrictor 56 includes a circumferential direction movement restricting surface 56a that is extended in the axial direction of the shaft portion 53 along a longer side edge of the second claw 542 and that is substantially perpendicular to the inner surface 54a of the second claw 542, and an axial direction movement restricting surface (second inclined surface) 56b that is a slope inclined to the plane perpendicular to the shaft center of the shaft portion 53. The axial direction movement restricting surface 56b is formed to be extended along the second claw 542 from a leading end of the circumferential direction movement restricting surface 56a and to be extended substantially parallel to the legs 40 on the even-numbered layers after the tilting process.

Figure 11:
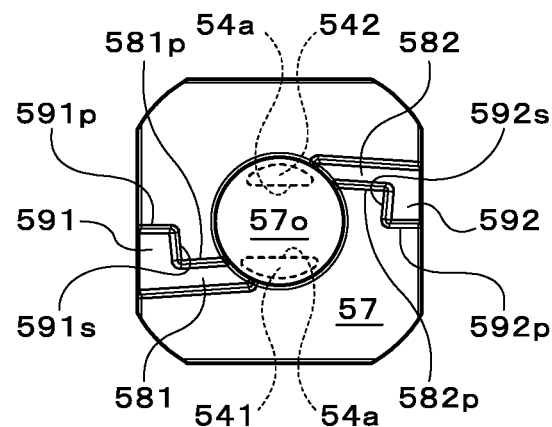
FIG. 11 is a bottom view illustrating a bending member in the bending process machine according to the present disclosure.
Figure 12:
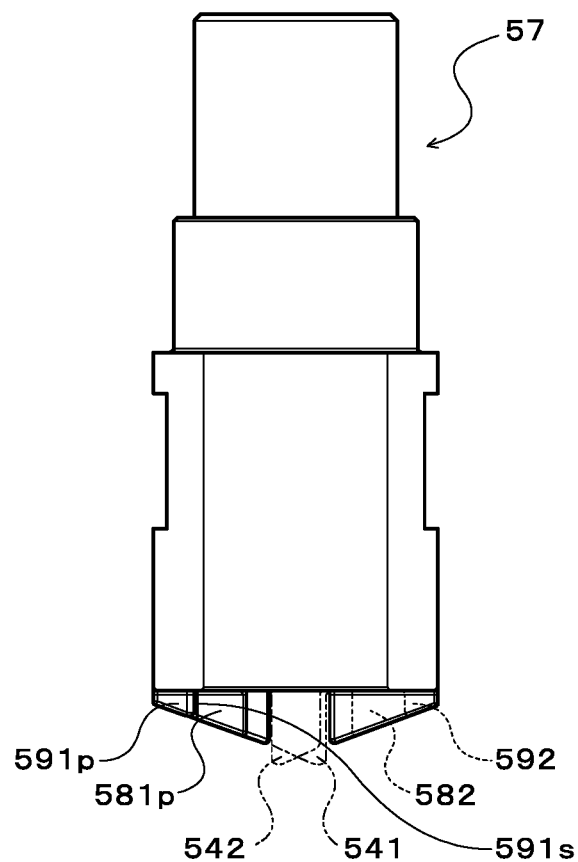
FIG. 12 is a side view illustrating the bending member in the bending process machine according to the present disclosure.

The bending member 57 is a tubular member having a hole (circular hole) 57o at its center. The shaft portion 53 of the clamp member 51 is inserted in the hole 57o, such that the first claw 541 and the second claw 542 are protruded from an end face (lower face in FIG. 8) of the bending member 57. The bending member 57 is supported by the shaft portion 53, such as to be unmovable in the axial direction relative to the clamp member 51 and to be coaxially rotatable relative to the clamp member 51. As shown in FIG. 11 and FIG. 12, the bending member 57 includes a first holding portion 581, a first pressing portion 591, a second holding portion 582 and a second pressing portion 592.

The first holding portion 581 is a projection protruded in the axial direction from the end face (lower face in FIG. 8) of the bending member 57. As shown in FIG. 11, the first holding portion 581 includes a pressing surface 581p formed to intersect with the hole 57o and to be continuous across an interval with the inner surface 54a of the first claw 541 of the clamp member 51 inserted in the hole 57o. The first pressing portion 591 is a projection integrally formed with the first holding portion 581 and protruded in the axial direction from the end face (lower face in FIG. 8) of the bending member 57. According to the embodiment, the first holding portion 581 and the first pressing portion 591 are coupled with each other in an approximately L shape.

As shown in FIG. 11, the first pressing portion 591 includes a pressing surface 591p and a first moving restricting surface 591s. The pressing surface 591p is extended from the outer circumferential side toward the shaft center side of the bending member 57 and is located nearer to the second claw 542-side of the clamp member 51 inserted in the hole 57o than the pressing surface 581p of the first holding portion 581. The first movement restricting surface 591s is formed to intersect with both the pressing surface 581p of the first holding portion 581 and the pressing surface 591p. Furthermore, as shown in FIG. 12, end faces (lower faces in the drawing) of the first holding portion 581 and the first pressing portion 591 that are formed integrally with each other are inclined such as to be extended substantially parallel to the legs 40 on the odd-numbered layers after the tilting process, like the free end of the first claw 541.

The second holding portion 582 is a projection protruded in the axial direction from the end face (lower face in FIG. 8) of the bending member 57. As shown in FIG. 11, the second holding portion 582 includes a pressing surface 582p formed to intersect with the hole 57o and to be continuous across an interval with the inner surface 54a of the second claw 542 of the clamp member 51 inserted in the hole 57o. The pressing surface 582p of the second holding portion 582 is formed to be extended substantially symmetrical to the pressing surface 581p of the first holding portion 581 with respect to the shaft center of the bending member 57. The second pressing portion 592 is a projection integrally formed with the second holding portion 582 and protruded in the axial direction from the end face (lower face in FIG. 8) of the bending member 57. According to the embodiment, the second holding portion 582 and the second pressing portion 592 are coupled with each other in an approximately L shape.

As shown in FIG. 11, the second pressing portion 592 includes a pressing surface 592p and a second moving restricting surface 592s. The pressing surface 592p is extended from the outer circumferential side toward the shaft center side of the bending member 57 and is located nearer to the first claw 541-side of the clamp member 51 inserted in the hole 57o than the pressing surface 582p of the second holding portion 582. The second movement restricting surface 592s is formed to intersect with both the pressing surface 582p of the second holding portion 582 and the pressing surface 592p. Furthermore, as shown in FIG. 12, end faces (lower faces in the drawing) of the second holding portion 582 and the second pressing portion 592 that are formed integrally with each other are inclined such as to be extended substantially parallel to the legs 40 on the even-numbered layers after the tilting process, like the free end of the second claw 542.

Figure 13:
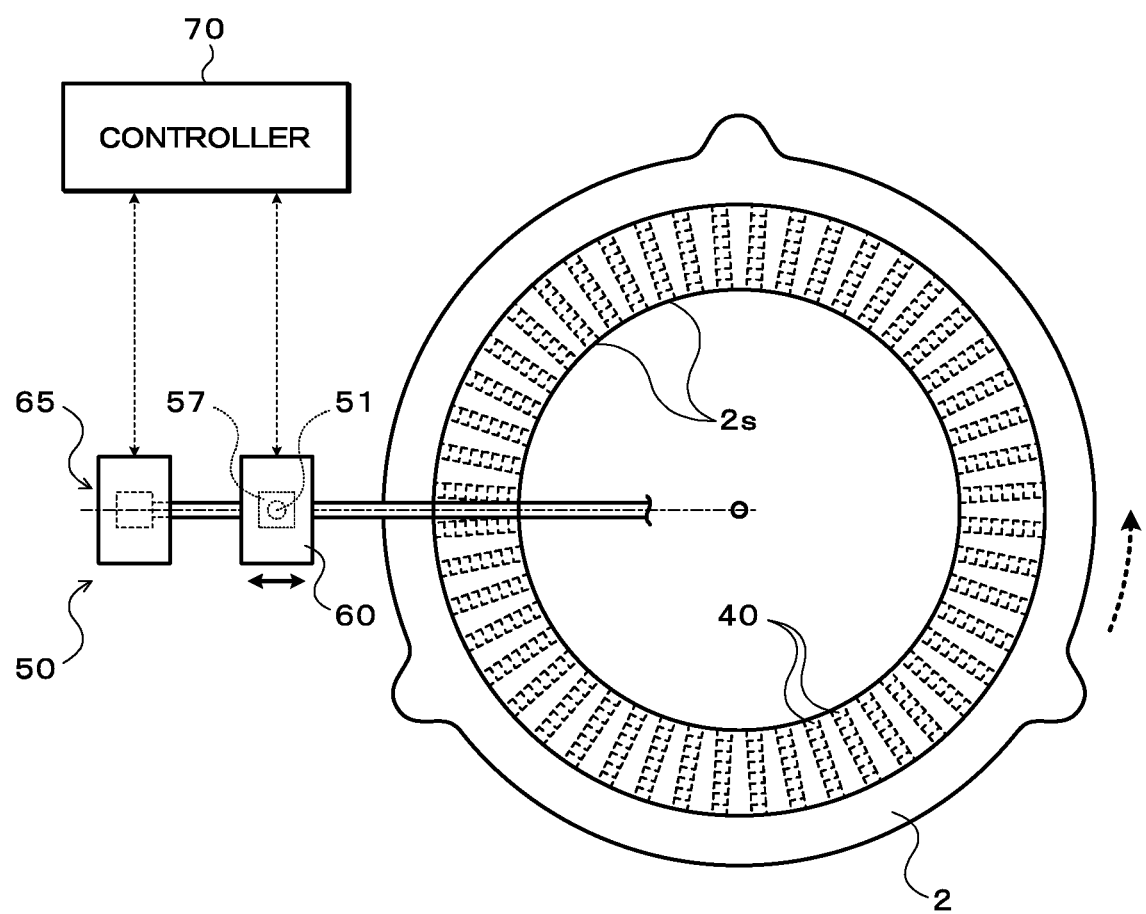
FIG. 13 is a schematic configuration diagram illustrating the bending process machine according to the present disclosure.

As shown in FIG. 13, the bending process machine 50 further includes a driving unit 60 configured to rotate the clamp member 51 and the bending member 57 relative to each other, a moving mechanism 65 configured to move the driving unit 60, and a controller 70 configured to control the driving unit 60 and the moving mechanism 65. As illustrated, the driving unit 60 and the moving mechanism 65 are placed in the neighborhood of a rotating table (not shown) which the stator core 2 is placed on after completion of the leg tilting process.

The driving unit 60 includes a lifting mechanism configured to hold the base end portion 52 of the clamp member 51 in a non-rotatable manner and to integrally move up and down the clamp member 51 and the bending member 57 relative to the stator core 2, and a rotating mechanism coupled with the bending member 57 to rotate the bending member 57 about the shaft center (neither shown). Both the lifting mechanism and the rotating mechanism include motors. These motors are operated to make the clamp member 51 and the bending member 57 close to and away from the legs 40 of the plurality of segment coils 4 assembled to the stator core 2 and to coaxially rotate the bending member 57 relative to the clamp member 51. The moving mechanism 65 includes, for example, a ball screw, a slider and a motor provided to rotate the ball screw, and is configured to move the driving unit 60 in the radial direction of the stator core 2 between a standby position and a position above the stator core 2 on the rotating table. The controller 70 includes a computer having a CPU, a ROM, a RAM and the like, a driving circuit of the motors of the driving unit 60, and a driving circuit of of the motor of the moving mechanism 65. The controller 70 also controls a driving unit of the rotating table which the stator core 2 is placed on. The driving unit 60 of the bending process machine 50 may be configured to rotate the clamp member 51 relative to the bending member 57.

The following describes in detail the leading end bending process (S40) to bend the leading ends T of the plurality of legs 40 protruded from the plurality of slots 2s toward the outer circumferential side or toward the shaft center side of the stator core 2 by using the bending process machine 50 described above.

Figure 14:
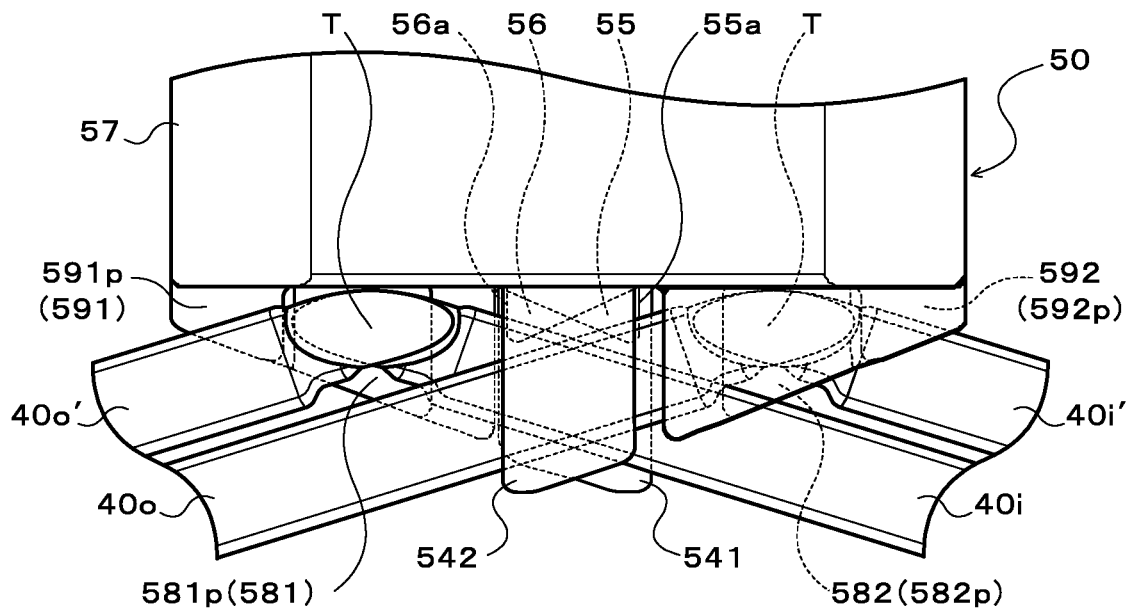
FIG. 14 is a diagram illustrating a manufacturing procedure of the stator according to the present disclosure.
Figure 15:
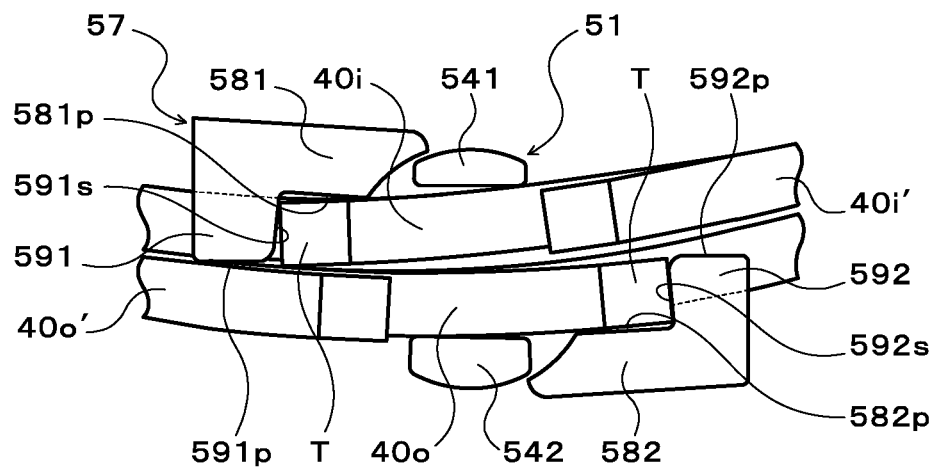
FIG. 15 is a diagram illustrating a manufacturing procedure of the stator according to the present disclosure.

On start of the leading end bending process, the moving mechanism 65 of the bending process machine 50 first moves the driving unit 60, i.e., the clamp member 51 and the bending member 57, to a position above the two legs 40 adjacent to each other in the radial direction as a first bending object. The two legs 40 as the bending object of the bending process machine 50 are two legs 40 that are protruded from different slots 2s and that are adjacent to each other in the radial direction, and are two legs 40 that intersect with each other in the state that no other leading end T is present in the circumferential direction between the respective leading ends T when being viewed in the radial direction of the stator core 2 after completion of the leg tilting process, as shown in FIG. 14 and FIG. 15.

In the description below, out of the two legs 40 clamped by the clamp member 51, one leg located on the inner side in the radial direction (on the odd-numbered layer) is called "inner leg 40i", and the other leg located on the outer side in the radial direction (on the even-numbered layer) is called "outer leg 40o". As shown in FIG. 14 and FIG. 15, the inner leg 40i is adjacent to a leg 40i', which is to be bonded to the outer leg 40o, in the circumferential direction on the slot 2s-side (left side in the drawing) which the outer leg 40o is inserted in. As shown in FIG. 14 and FIG. 15, the outer leg 40o is adjacent to a leg 40o', which is to be bonded to the inner leg 40i, in the circumferential direction on the slot 2s-side (right side in the drawing) which the inner leg 40i is inserted in.

After the driving unit 60, i.e., the clamp member 51 and the bending member 57, are stopped immediately above an intersection of the inner leg 40i and the outer leg 40o, the driving unit 60 moves down the clamp member 51 and the bending member 57 by a predetermined distance toward the stator core 2. This causes the first claw 541 and the second claw 542 of the clamp member 51 to enter a narrow clearance in the radial direction between the legs 40 and to clamp the intersection of the inner leg 40i and the outer leg 40o. Additionally, as clearly understood from FIG. 16, when the clamp member 51 and the bending member 57 are moved down, the axial direction movement restricting surface 55b of the first movement restrictor 55 of the clamp member 51 appropriately restricts an upward movement of the inner leg 40i in the axial direction of the stator core 2, and the axial direction movement restricting surface 56b of the second movement restrictor 56 appropriately restricts an upward movement of the outer leg 40o in the axial direction of the stator core 2. As a result, this configuration more properly clamps the intersection of the inner leg 40i and the outer leg 40o, while suppressing rattle.

Figure 16:
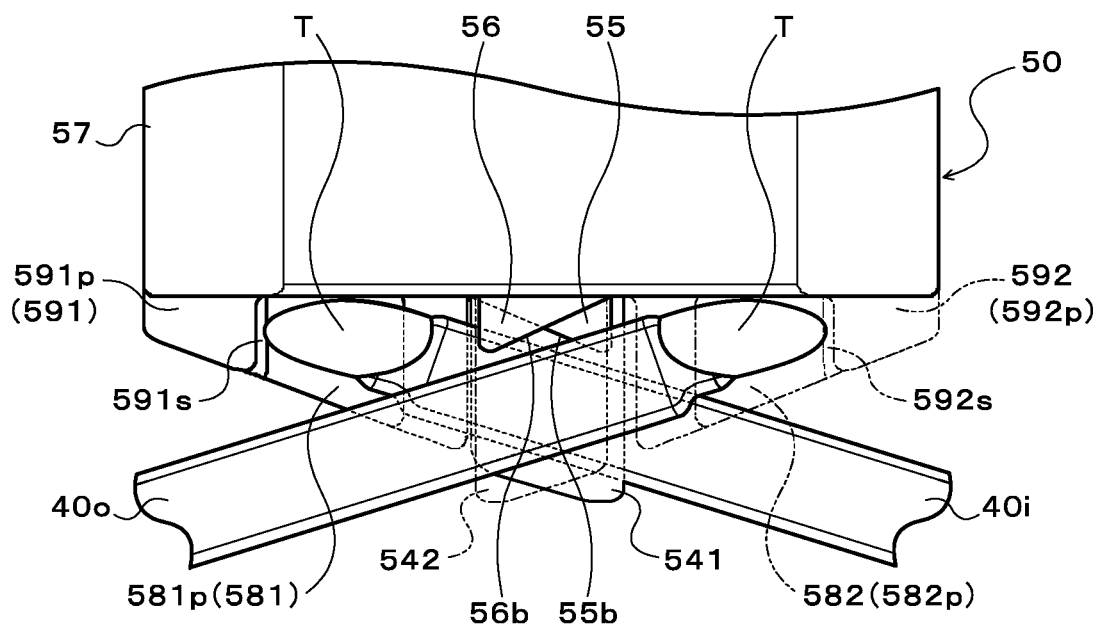
FIG. 16 is a diagram illustrating a manufacturing procedure of the stator according to the present disclosure.

Along with the downward movement of the clamp member 51 and the bending member 57, the leading end T of the inner leg 40i appropriately hits against the first movement restricting surface 591s of the first pressing portion 591 of the bending member 57, as clearly understood from FIG. 16. This configuration restricts the movement of the inner leg 40i toward the tilting side in the circumferential direction and causes an inner side face on the leading end T-side of the inner leg 40i to smoothly come into contact with the pressing surface 581p of the first holding portion 581 of the moving-down bending member 57 as shown in FIG. 15. Similarly, along with the downward movement of the clamp member 51 and the bending member 57, the leading end T of the outer leg 40o appropriately hits against the second movement restricting surface 592s of the second pressing portion 592 of the bending member 57. This configuration restricts the movement of the outer leg 40o toward the tilting side in the circumferential direction and causes an outer side face on the leading end T-side of the outer leg 40o to smoothly come into contact with the pressing surface 582p of the second holding portion 582 of the moving-down bending member 57 as shown in FIG. 15.

Furthermore, as clearly understood from FIG. 14, along with the downward movement of the clamp member 51 and the bending member 57, the leading end T of the leg 40i' that is adjacent to the inner leg 40i in the circumferential direction on the leading end T-side of the outer leg 40o appropriately hits against the circumferential direction movement restricting surface 55a of the first movement restrictor 55 of the clamp member 51. This configuration restricts the movement of the leg 40i' toward the tilting side in the circumferential direction and suppresses interference of the inner leg 40i with the leg 40i' in the circumferential direction. Similarly, along with the downward movement of the clamp member 51 and the bending member 57, the leading end T of the leg 40o' that is adjacent to the outer leg 40o in the circumferential direction on the leading end T-side of the inner leg 40 appropriately hits against the circumferential direction movement restricting surface 56a of the second movement restrictor 56 of the clamp member 51. This configuration restricts the movement of the leg 40o' toward the tilting side in the circumferential direction and suppresses interference of the outer leg 40o0 with the leg 40o' in the circumferential direction.

Figure 17:
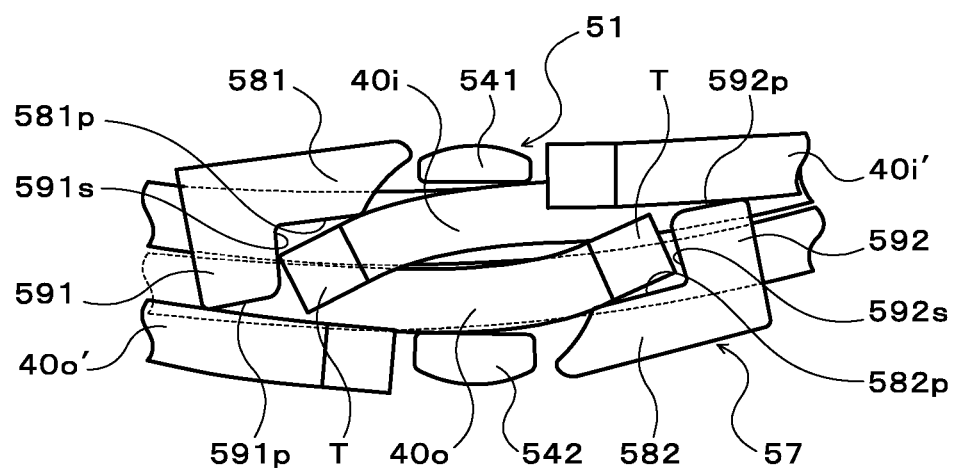
FIG. 17 is a diagram illustrating a manufacturing procedure of the stator according to the present disclosure.

As shown in FIG. 15, after the inner side face on the leading end T-side of the inner leg 40i is held by the first holding portion 581 of the bending member 57 and the outer side face on the leading end T-side of the outer leg 40o is held by the second holding portion 582 of the bending member 57, the driving unit 60 rotates the bending member 57 relative to the clamp member 51 in a predetermined direction (counterclockwise direction in FIG. 15). As shown in FIG. 17, the leading end T of the inner leg 40i is accordingly bent toward the outer circumferential side of the stator core 2 (upward in the drawing) about the intersection as the starting point, and the leading end T of the outer leg 40o is bent toward the shaft center side of the stator core 2 (downward in the drawing) about the intersection as the starting point. In this bending process of the leading ends T, the inner leg 40i is supported from the stator core 2-side by the leg 40 located below (on the stator core 2-side of) the inner leg 40i (i.e., the leg 40 protruded from an adjacent slot 2s), and the outer leg 40o is supported from the stator core 2-side by the leg 40 located below (on the stator core 2-side of) the outer leg 40o (i.e., the leg 40 protruded from an adjacent slot 2s).

When the bending member 57 is rotated, the pressing surface 591p of the first pressing portion 591 comes into contact with an outer side face of the leg 40o' that is adjacent to the outer leg 40o in the circumferential direction on the leading end T-side of the inner leg 40i. Additionally, the pressing surface 592p of the second pressing portion 592 comes into contact with an inner side face of the leg 40i' that is adjacent to the inner leg 40i in the circumferential direction on the leading end T-side of the outer leg 40o. This configuration causes the first pressing portion 591 to press the leg 40o' adjacent to the outer leg 40o in the circumferential direction outward in the radial direction, while causing the second pressing portion 592 to press the leg 40i' adjacent to the inner leg 40i in the circumferential direction inward in the radial direction, along with the rotation of the bending member 57. As a result, this configuration suppresses interference of the inner leg 40i and the outer leg 40o that are the object to be processed with the legs 40i' and 40o' located in the periphery in the bending process of the leading ends T of the inner leg 40i and the outer leg 40o and thereby effectively suppresses the leading end T of the leg 40 and the insulating layer from being damaged.

Figure 18:
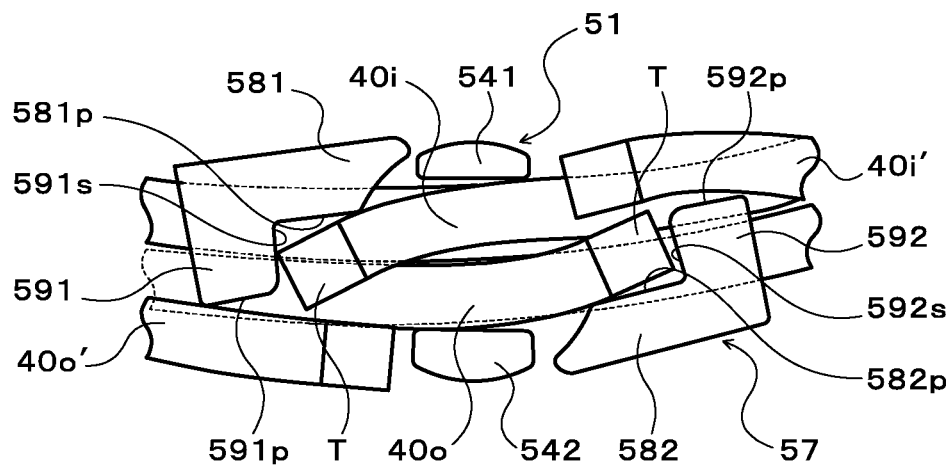
FIG. 18 is a diagram illustrating a manufacturing procedure of the stator according to the present disclosure.

Afterward, the leading ends T of the inner leg 40i and the outer leg 40o specified as an object are sequentially bent, while the moving mechanism 65 moves the driving unit 60 (i.e., the clamp member 51 and the bending member 57) in the radial direction. Additionally, the above series of processing is repeated with rotating the stator core 2 (rotating table) by every predetermined angle. With progress of the leading end bending process, the leg 40i' or the leg 40o' having the bent leading end T appears in the periphery of the inner leg 40i and the outer leg 40o specified as a bending object. Even in such cases, as shown in FIG. 18, along with the rotation of the bending member 57, the leg 40o' is pressed outward in the radial direction by the first pressing portion 591, and the leg 40i' is pressed inward in the radial direction by the second pressing portion 592. This configuration suppresses interference of the inner leg 40i and the outer leg 40o that are the object to be processed with the leg 40i' or 40o' having the bent leading end T (the leg 40i' in the illustrated example of FIG. 18) in the bending process of the leading ends T of the inner leg 40i and the outer leg 40o and thereby effectively suppresses the leading end T of the leg 40 and the insulating layer from being damaged.

Figure 19:
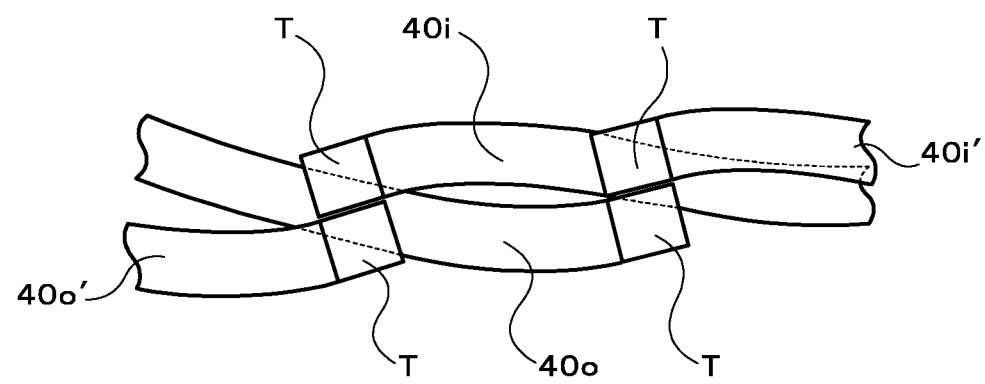
FIG. 19 is a diagram illustrating a manufacturing procedure of the stator according to the present disclosure.

The leading end bending process using the bending process machine 50 described above efficiently bends the leading ends T of the inner leg 40i and the outer leg 40o in a narrow space where a large number of legs 40 are arranged, and enables the leading ends T that are to be bonded to each other, to come into contact with each other, while being extended substantially parallel to each other by the spring-back of the legs 40 as shown in FIG. 19. This configuration enables the leading ends T that are inclined relative to the shaft center of the stator core 2 and that are opposed to each other, to be welded each other while appropriately coming into contact with each other. This reduces the load of the clamp during welding of the leading ends T and improves the bonding accuracy (welding quality) of the plurality of segment coils 4. As a result, this improves the bonding accuracy of the plurality of segment coils 4, while shortening the axial length of the stator 1. This accordingly achieves downsizing of the rotating electrical machine M and enhances the reliability.

As described above, the manufacturing method of the stator 1 according to the present disclosure tilts the plurality of legs 40 protruded from the plurality of slots 2s, such that the leading ends T of the two legs 40 adjacent to each other in the radial direction are extended in the opposite directions along the circumferential direction. The leading ends T that are to be bonded to each other accordingly approach each other, while being inclined in the opposite directions relative to the shaft center of the stator core 2. The manufacturing method subsequently clamps the intersection of the two legs 40 that are protruded from different slots 2s, that are adjacent to each other in the radial direction, and that intersect with each other without any other leading end T located in the circumferential direction between their leadings ends T when being viewed in the radial direction. The manufacturing method then bends the leading end T of the inner leg 40i located on the inner side in the radial direction out of the clamped two legs 40, toward the outer circumferential side of the stator core 2 about the intersection as the starting point and bends the leading end T of the outer leg 40o located on the outer side in the radial direction toward the shaft center side of the stator core 2 about the intersection as the starting point. This series of processing is repeated, so that the leading ends T that are to be bonded to each other come into contact with each other, while being extended substantially parallel to each other by the spring-back of the legs 40. This enables the leading ends T that are inclined relative to the shaft center of the stator core 2 and that are opposed to each other, to be welded to each other in the state that the leading ends T are properly in contact with each other, and thereby improves the bonding accuracy (welding quality) of the plurality of segment coils 4. Inclining the leading ends T of the plurality of legs 40 relative to the shaft center of the stator core 2 significantly shortens the axial length of the coil end portion 3a. As a result, the manufacturing method of the stator 1 according to the present disclosure improves the bonding accuracy of the plurality of segment coils 4 to form the stator coils 3u, 3v and 3w, while shortening the axial length of the stator 1.

The bending process machine 50 according to the present disclosure includes the clamp member 51 configured to clamp the intersection of the two legs 40 that are protruded from different slots 2s, that are adjacent to each other in the radial direction, and that intersect with each other without any other leading end T located in the circumferential direction between their leadings ends T when being viewed in the radial direction; the bending member 57 including the first holding portion 581 configured to hold the inner side face on the leading end T-side of the inner leg 40i located on the inner side in the radial direction out of the two legs 40 clamped by the clamp member 51 and the second holding portion 582 configured to hold the outer side face on the leading end T-side of the outer leg 40o located on the outer side in the radial direction out of the two legs 40 clamped by the clamp member 51; and the driving unit 60 configured to rotate the clamp member 51 and the bending member 57 relative to each other. This bending process machine 50 is used to incline the leading ends T of the plurality of legs 40 relative to the shaft center of the stator core 2 and thereby shorten the axial length of the stator 1, while improving the bonding accuracy of the plurality of segment coils 4 to form the stator coils 3u, 3v and 3w.

In the stator 1 according to the present disclosure, the leading ends T of the two legs 40 that are adjacent to each other in the radial direction are tilted such as to be inclined relative to the shaft center of the stator core 2 and to be extended in the opposite directions along the circumferential direction. Additionally, out of the two legs 40 having the respective leading ends T that are to be bonded to each other, one leading end T located on the inner side in the radial 5 direction is bent toward the outer circumferential side of the stator core 2, whereas the other leading end T located on the outer side in the radial direction is bent toward the shaft center side of the stator core 2. The leading ends T that are to be bonded to each other are accordingly welded to each other, while being extended substantially parallel to each other and properly come into contact with each other by the spring-back of the legs 40. The configuration of the stator 1 according to the present disclosure thus improves the bonding accuracy of the plurality of segment coils 4 to form the stator coils 3u, 3v and 3w, while shortening the axial length. As a result, this achieves downsizing of the rotating electrical machine M and enhances the reliability.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the stator and so on.

The invention claimed is:

1. A manufacturing method of a stator, the stator including a stator core including a plurality of slots that are extended in a radial direction and that are formed at intervals in a circumferential direction; and a plurality of segment coils respectively including a pair of legs that are inserted in different slots, the plurality of segment coils being configured to form a plurality of stator coils by electrical bonding of leading ends of corresponding legs, the manufacturing method comprising:

arranging the plurality of segment coils to be adjacent to each other in the radial direction and assembling the plurality of segment coils to the stator core, such that a plurality of the legs are protruded from each of the plurality of slots;

tilting the plurality of legs protruded from the plurality of slots, such that leading ends of two legs adjacent to each other in the radial direction are respectively inclined relative to a shaft center of the stator core and are extended in opposite directions along the circumferential direction;

clamping an intersection of an inner leg located on an inner side in the radial direction and an outer leg located on an outer side in the radial direction by a clamp member, the inner leg and the outer leg being protruded from different slots, being adjacent to each other in the radial direction, and intersecting with each other without any other leading end located in the circumferential direction between respective leading ends thereof when being viewed in the radial direction, the clamp member including a shaft portion, a first claw and a second claw extended from a leading end of the shaft portion and opposed to each other in a radial direction of the shaft portion, and a first movement restrictor and a second movement restrictor formed between the first claw and the second claw in the radial direction of the shaft portion;

holding an inner side face on a leading end side of the inner leg by a bending member, and holding an outer side face on the leading end side of the outer leg by the bending member, the bending member being a tubular member having a hole at a center thereof through which the shaft portion of the clamp member is inserted such that the first claw and the second claw protrude from an end face of the bending member, the bending member including a first holding portion configured to hold the inner side face on a leading end side of the inner leg located on the inner side in the radial direction clamped by the clamp member, and a second holding portion configured to hold the outer side face on the leading end side of the outer leg located on the outer side in the radial direction clamped by the clamp member;

rotating the clamp member and the bending member relative to each other to bend the leading end of the inner leg located on the inner side in the radial direction toward an outer circumferential side of the stator core, and to bend the leading end of the outer leg located on the outer side in the radial direction toward a shaft center side of the stator core; and welding the leading ends that are opposed to each other.

2. The manufacturing method of the stator according to claim 1, wherein the inner leg is a leg adjacent to a leg that is to be bonded to the outer leg, in the circumferential direction on a slot side which the outer leg is inserted in, and the outer leg is a leg adjacent to a leg that is to be bonded to the inner leg, in the circumferential direction on a slot side which the inner leg is inserted in.

3. The manufacturing method of the stator according to claim 1, further comprising:

forming the segment coils from a conductor coated with an insulating layer; and processing the leading end such that a surface of the leading end on an opposite side to a tilting direction of the leg is inclined in the tilting direction, and removing the insulating layer from the leading end.

4. The manufacturing method of the stator according to claim 3, further comprising:

forming the surface of the leading end on the opposite side to the tilting direction as a curved surface.

5. The manufacturing method of the stator according to claim 1, further comprising:
bonding the leading ends that are opposed to each other by laser welding.

6. The manufacturing method of the stator according to claim 1,
wherein the bending member further comprises a first pressing portion coupled to the first holding portion in an approximately L shape, and a second pressing portion coupled to the second holding portion in an approximately L shape.

7. The manufacturing method of the stator according to claim 6,
wherein the first holding portion is a projection protruded in an axial direction from the end face of the bending member, the first holding portion including a first pressing surface formed to intersect with the hole and to be continuous across an interval with an inner surface of the first claw of the clamp member inserted in the hole, and
wherein the second holding portion is a projection protruded in the axial direction from the end face of the bending member, the second holding portion including a second pressing surface formed to intersect with the hole and to be continuous across an interval with an inner surface of the second claw of the clamp member inserted in the hole.

8. The manufacturing method of the stator according to claim 7,
wherein the first pressing portion includes a first pressing surface and a first moving restricting surface, the first pressing surface being extended from an outer circumferential side toward a shaft center side of the bending member and located nearer to a second claw side of the clamp member inserted in the hole than the first pressing surface of the first holding portion, and the first movement restricting surface being formed to intersect with both the first pressing surface of the first holding portion and the pressing surface, and
wherein the second pressing portion includes a second pressing surface and a second moving restricting surface, the second pressing surface being extended from the outer circumferential side toward the shaft center side of the bending member and located nearer to a first claw side of the clamp member inserted in the hole than the second pressing surface of the second holding portion, and the second movement restricting surface being formed to intersect with both the second pressing surface of the second holding portion 582 and the pressing surface.

* * * * *